(12) United States Patent
Yoon (10) Patent No.: US 8,878,895 B2
(45) Date of Patent: Nov. 4, 2014

(54) VIDEO COMMUNICATING APPARATUS HAVING EYE-TO-EYE COMMUNICATION FUNCTION AND METHOD THEREOF

(75) Inventor: Seung Hyun Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 281 days.

(21) Appl. No.: 13/314,755

(22) Filed: Dec. 8, 2011

(65) Prior Publication Data
US 2012/0147131 A1    Jun. 14, 2012

(30) Foreign Application Priority Data
Dec. 9, 2010    (KR) .......................... 10-2010-0125823

(51) Int. Cl.
*H04N 7/14*    (2006.01)

(52) U.S. Cl.
CPC ........................................ *H04N 7/14* (2013.01)
USPC ................... 348/14.16; 348/14.01; 348/14.08

(58) Field of Classification Search
USPC .......................................... 348/14.01–14.16
See application file for complete search history.

(56) References Cited

U.S. PATENT DOCUMENTS

| | | | |
|---|---|---|---|
| 6,798,457 B2 | 9/2004 | Boyden et al. | |
| 6,888,562 B2 * | 5/2005 | Rambo et al. | ............. 348/14.16 |
| 7,209,160 B2 | 4/2007 | McNelley et al. | |
| 2008/0043100 A1 * | 2/2008 | Sobel et al. | ................... 348/139 |
| 2009/0102763 A1 * | 4/2009 | Border et al. | ................... 345/87 |
| 2009/0231474 A1 * | 9/2009 | Ludwig | ......................... 348/252 |
| 2011/0102538 A1 * | 5/2011 | Tan | ............................. 348/14.08 |

FOREIGN PATENT DOCUMENTS

| | | |
|---|---|---|
| KR | 2000-0006887 | 2/2000 |
| KR | 10-2004-0051651 | 6/2004 |

* cited by examiner

*Primary Examiner* — Melur Ramakrishnaiah
(74) *Attorney, Agent, or Firm* — Staas & Halsey LLP (57) ABSTRACT

Provided are a video communication apparatus having an eye-to-eye communication function that enables video communication users to communicate with each other in an eye-to-eye state, and a method thereof. The apparatus includes a display unit configured to display a video of a video communication partner, the display unit including a plurality of cameras activated according to a selection control signal; a video processor configured to encode a captured video from the activated camera, and to decode a video from the video communication partner and identify a position of the video communication partner's eyes from the video; a camera selector configured to activate a camera installed in a position corresponding to the position among the plurality of cameras; and a transceiver configured to transmit the encoded video from the video processor to the video communication partner and provide the video from the video communication partner to the video processor.

11 Claims, 4 Drawing Sheets

VIDEO COMMUNICATING APPARATUS HAVING EYE-TO-EYE COMMUNICATION FUNCTION AND METHOD THEREOF

CLAIM FOR PRIORITY

This application claims priority to Korean Patent Application No. 10-2010-0125823 filed on Dec. 9, 2010 in the Korean Intellectual Property Office (KIPO), the entire contents of which are hereby incorporated by reference.

BACKGROUND

1. Technical Field

Example embodiments of the present invention relate to a video communication apparatus, and more particularly, to a video communication apparatus having an eye-to-eye communication function that enables video communication users to communicate with each other in an eye-to-eye state, and a method thereof.

2. Related Art

Recently, communication between users is being shifted from telephone and conferencing using only voice to telephone and conferencing using video.

In video communication, eye-to-eye contact between video communication partners shows which position a partner holds in a conversation and to what degree the partner is interested in the other partner's speech, and is a very important element in video communication. The eye-to-eye contact provides a clue as to when a conversation has begun or when someone has begun speaking to adjust the flow of a conversation. The eye-to-eye contact is a part of non-verbal language indicating that one partner is interested in conversation with the other partner. Further, emotional states are known to be observable through motions of the eyes, forehead, mouth, and facial muscles that play an important role in conveying emotion.

However, since a camera for video communication in most currently commercially available video communication apparatuses is installed in an upper portion of a display device, it is difficult to hold a conversation in eye-to-eye contact with a video communication partner, which degrades a sense of reality. In particular, the larger the display device is, the more severe the problem.

In video communication, techniques for eye-to-eye contact between callers include hardware-based approaches and software-based approaches.

The hardware-based approaches include optical division schemes, such as a half-transparent mirror (UM) scheme or a blazed half-mirror (BEM) scheme, space division schemes, and time division schemes.

In the half-transparent mirror scheme, a figure of a user viewing a screen is reflected by a half-transparent mirror and input to a camera. The half-transparent mirror must be tilted 45° before a monitor. Accordingly, a distance between a user and the monitor increases in proportion to a size of the monitor, increasing an overall system size. Further, in the half-transparent mirror scheme, the half-transparent mirror passes only half of an amount of light and reflects the other half. Accordingly, the screen viewed by the user is not clear and a separate mechanism for camera installation is necessary.

In the BHM scheme, several small-sized half-transparent mirrors are disposed in parallel with a monitor and a camera is disposed orthogonal to an angle of reflection of a BHM. The BHM scheme has resolved a problem of an increasing distance between the half-transparent mirror and the monitor in the half-transparent mirror scheme. However, in the BHM scheme, a specially made half-transparent mirror is necessary and there is still a restriction on a camera installation space.

In the space division scheme, a small hole is formed in a position of a screen in which a partner's eyes are displayed, a small camera is installed in the hole, and an image of the partner is projected onto the screen using a video projector. This scheme has drawbacks in that the hole is formed in the screen and the camera hole is shown to be superimposed on the image of the partner. Further, since strong light of the video projector is directly input to the camera, light rays incident from the projector and incident light rays reflected from a user are discriminated using, for example, a polarizing filter.

In the time division scheme, a camera and a video projector are placed behind a switchable LCD panel, in which, when a LCD is driven, an image of a partner is displayed, and when the LCD is not driven, an image of a user is captured by a camera through a transparent LCD. In this scheme, the camera or a display can use half of a total time, such that intensity of light rays incident to the camera and an amount of displayed light are disadvantageously reduced.

Further, since the conventional methods provide similar effects to eye-to-eye contact with a certain limitation on a distance between the camera and a person, a size of the display device, etc., the eye-to-eye contact between callers is often not practically achieved. For example, if a photographed person is too large or small, it is difficult to obtain the eye-to-eye contact effect when the person is not located in a center. The larger the device is, the more sever this problem is.

Additionally, a software-based method includes a method of correcting a line of sight by subjecting a captured video to three-dimensional processing. However, in this method, a video of a person must be corrected in real time and output. Thus, it is practically difficult to output a corrected video without delay, and a delay time increases as a size of a display screen increases.

SUMMARY

Accordingly, example embodiments of the present invention are installed to substantially obviate one or more problems due to limitations and disadvantages of the related art.

Example embodiments of the present invention provide a video communication apparatus having an eye-to-eye communication function that enables eye-to-eye video communication to be easily performed.

Example embodiments of the present invention also provide a video communication method that enables eye-to-eye video communication to be easily performed.

In some example embodiments, a video communication apparatus includes a display unit configured to display a video of a video communication partner, the display unit including a plurality of cameras activated according to a selection control signal; a video processor configured to encode a captured video from the activated camera among the plurality of cameras, and to decode a video provided from the video communication partner and identify a position of the video communication partner's eyes from the decoded video; a camera selector configured to activate the camera installed in a position corresponding to the position of the video communication partner's eyes among the plurality of cameras; and a transceiver configured to transmit the encoded video provided from the video processor to the video communication partner, and provide the video received from the video communication partner to the video processor.

Each of the plurality of cameras may photograph a wider area than a display area of the display unit.

The video processor may receive a captured video from a prescribed given camera among the plurality of cameras, recognize a position of a user's eyes based on the received video, determine a position of a camera corresponding to the recognized position of the user's eyes, and provide information of the determined position of the camera to the camera selector.

The camera selector may activate the prescribed given camera if video communication is executed, and then provide a selection control signal for activating a camera corresponding to the information of the determined camera position provided from the video processor among the plurality of cameras if the information of the determined position of the camera is provided from the video processor.

The video processor may encode the information of the determined position of the camera together with the captured video and provide the resultant video to the transceiver.

The video processor may decode the video of the video communication partner, extract position information of an activated camera of the video communication partner, and provide the position information to the camera selector.

In other example embodiments, a method of performing video communication in a video communication apparatus includes decoding a video received from a video communication partner; recognizing a position of the video communication partner's eyes from the decoded video; activating a camera installed in a position corresponding to the recognized position of the video communication partner's eyes among a plurality of cameras installed in a display unit of the video communication apparatus; and encoding a captured video provided from the activated camera and transmitting the encoded video to the video communication partner.

The recognizing of the position of the video communication partner's eyes from the decoded video may include extracting position information of the activated camera of the video communication partner from the decoded video.

The method may further include: after recognizing a position of the video communication partner's eyes from the decoded video, adjusting a position in which the decoded video is to be displayed according to the recognized position of the video communication partner's eyes, and displaying the video.

The adjusting of the position in which the decoded video is to be displayed may include adjusting a display position of the decoded video so that the position of the video communication partner's eyes included in the decoded video matches the position of the activated camera.

In still other example embodiments, a method of performing video communication in a video communication apparatus includes: capturing a video of a user; detecting a position of a user's eyes based on the captured video of the user; activating a camera installed in a position corresponding to the detected position of the user's eyes among a plurality of cameras installed in a display unit of the video communication apparatus; and encoding a captured video provided from the activated camera and transmitting the encoded video to a video communication partner.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific example embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A current display technique is being developed from a cathode ray tube (CRT) to a plasma display panel (PDP) or liquid crystal display (LCD) device having a small thickness and a large screen display area. Recently, a transparent screen technique is being developed. With the development of mobile terminals, very small camera lenses are also being developed.

It is desirable for a camera to perform photographing in a position of a user's eyes to achieve eye-to-eye contact with a video communication partner in video communication and display a captured video on a device of the video communication partner. For this, in the video communication apparatus according to an example embodiment of the present invention, a plurality of cameras are installed behind a display device, the camera installed in a position of eyes among the plurality of installed cameras is driven to photograph a caller, and a captured video is encoded and transmitted.

As described above, since display devices with large screens are recently being developed and camera modules are gradually becoming miniaturized, exposure of a camera installed in a display device can be miniaturized. Thus, video capturing using a camera and video output using a display device can both be normally performed.

Figure 1:
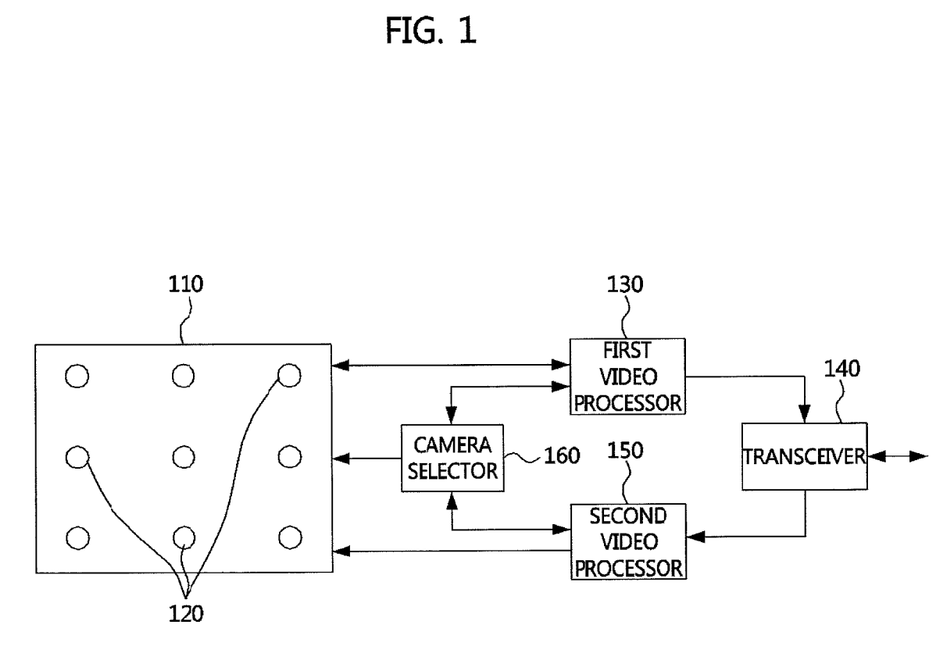
FIG. 1 is a block diagram illustrating a configuration of a video communication apparatus according to an example embodiment of the present invention.
Figure 2:
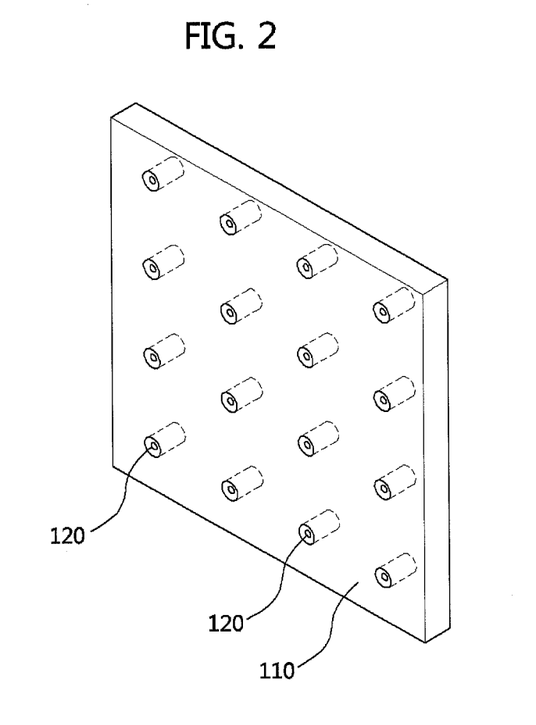
FIG. 2 is a conceptual diagram illustrating a display unit and a camera installation structure shown in FIG. 1.

FIG. 1 is a block diagram illustrating a configuration of a video communication apparatus according to an example embodiment of the present invention, and FIG. 2 is a conceptual diagram illustrating a display unit and a camera installation structure shown in FIG. 1.

Referring to FIGS. 1 and 2, a video communication apparatus 100 includes a display unit 110, a plurality of cameras 120, a first video processor 130, a transceiver 140, a second video processor 150, and a camera selector 160.

The display unit 110 may be configured of, for example, a PDP, an LCD or an organic light emitting diode (OLED). A plurality of holes are formed in the display unit 110 and the camera 120 is installed in each hole.

Specifically, the holes each having the same size as an external diameter of the camera are formed to be spaced by a previously set distance in the display unit 110, and the camera 120 is inserted into each hole. Here, the camera 120 inserted into the hole of the display unit 110 may be installed so that a lens surface of the camera 120 is coplanar with a surface of the display unit 110. Alternatively, the camera 120 may be installed to be inserted into the hole a certain distance from the surface of the display unit 110, and then a compensation lens may be installed in an area of the hole corresponding to a distance between the lens surface of the camera 120 and the surface of the display unit 110 in order to compensate for a photographing angle of the camera 120.

If a transparent screen technique is applied to a front surface of the display unit 110 in which the cameras are located, a small area is made transparent only when the camera is activated, for smooth camera photographing. If it is difficult to perform camera photographing, fewer pixels may be excluded for camera photographing.

As described above, in the video communication apparatus according to an example embodiment of the present invention, the plurality of holes are formed in positions of some of numerous pixels formed in the surface of the display unit 110 and the camera is installed in each formed hole. Accordingly, there is no problem in displaying a video received from a video communication partner or in capturing a video of the user.

The display unit 110 receives a decoded video of the video communication partner from the second video processor 150, and displays the received video.

The plurality of cameras 120 are installed in a plurality of holes formed in the display unit 110, respectively. Each of the plurality of cameras 120 is activated or deactivated according to a selection control signal from the camera selector 160, and the activated camera captures a video of the user and provides the captured video to the first video processor 130. Here, each of the plurality of cameras 120 may be configured to perform photographing with a wider view angle relative to the resolution of the display unit 110. For example, if the resolution of the display unit 110 is 1024×768, each camera 120 installed in the display unit 110 may be configured to have a view angle (e.g., 1920×1024) so that the camera can photograph a wider area than the display area (i.e., 1024×768) of the display unit 120.

The first video processor 130 receives the captured video from at least one selected camera of the plurality of cameras 120, encodes the received video according to a video coding standard, and provides the encoded video to the transceiver 140.

Alternatively, in another example embodiment of the present invention, the first video processor 130 may be configured to receive the captured video from a given camera of the plurality of cameras 120, recognize a position of the user's eyes based on the received video, determine a position of the camera corresponding to the recognized position of the user's eyes, provide information of the determined position of the camera to the camera selector 160, encode the position information of the camera together with the captured video, and transmit the resultant video to the video communication apparatus of the video communication partner via the transceiver 140.

The transceiver 140 may be configured of a wired and/or wireless network interface. The transceiver 140 transmits the video provided from the first video processor 130 to the video communication apparatus of the video communication partner or provides a video transmitted from the video communication partner to the second video processor 150.

The second video processor 150 receives the video transmitted from the video communication partner via the transceiver 140, decodes the received video, and provides the decoded video to the display unit 110.

Further, the second video processor 150 decodes the video of the video communication partner, recognizes a position of the video communication partner's eyes from the decoded video of the video communication partner, and provides information of the recognized eye position to the camera selector 160. Here, if camera position information is included in the video transmitted from the video communication partner, the second video processor 150 may extract the camera position information (i.e., position information of the activated camera) of the video communication partner from the decoded video without performing the above-described process of recognizing the position of the video communication partner's eyes, and provide the camera position information to the camera selector 160.

The camera selector 160 is connected to the plurality of cameras 120 installed in the display unit 110. The camera selector 150 provides a selection control signal for activating the camera corresponding to the camera position of the video communication partner provided from the second video processor 150 among the plurality of cameras 120 according the camera position information of the video communication partner, to the camera. Here, the camera selector 160 may be configured to provide the position information of the activated camera to the display unit 110 directly or via the second video processor 150 so that the position of the activated camera is displayed on the display unit 110 and accordingly the user recognizes the activated camera and performs video communication while facing the activated camera.

Alternatively, in another example embodiment of the present invention, if video communication starts, the camera selector 150 may be configured to drive a prescribed given camera of the plurality of cameras 120, and provide a selection control signal for activating the camera corresponding to a position of the user's eyes among the plurality of cameras 120 to the camera according to position information of a specific camera (i.e., a camera corresponding to a position of the user's eyes) if the position information is provided from the first video processor 130.

Figure 3:
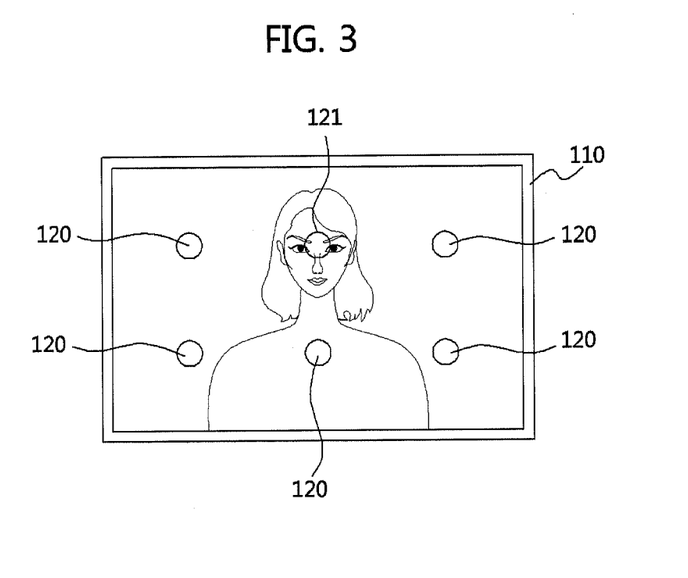
FIG. 3 is a conceptual diagram illustrating a video communication method according to an example embodiment of the present invention.

FIG. 3 is a conceptual diagram illustrating a video communication method according to an example embodiment of the present invention.

Referring to FIG. 3, in the video communication method according to an example embodiment of the present invention, the camera 121 installed in a position corresponding to the position of the video communication partner's eyes among the plurality of cameras 120 installed in the display unit 110 is activated to photograph a user. A captured video is then encoded according to a prescribed standard and transmitted to the video communication apparatus of the video communication partner, such that the user and the video communication partner can perform video communication in an eye-to-eye contact state between the user and the video communication partner.

Figure 4:
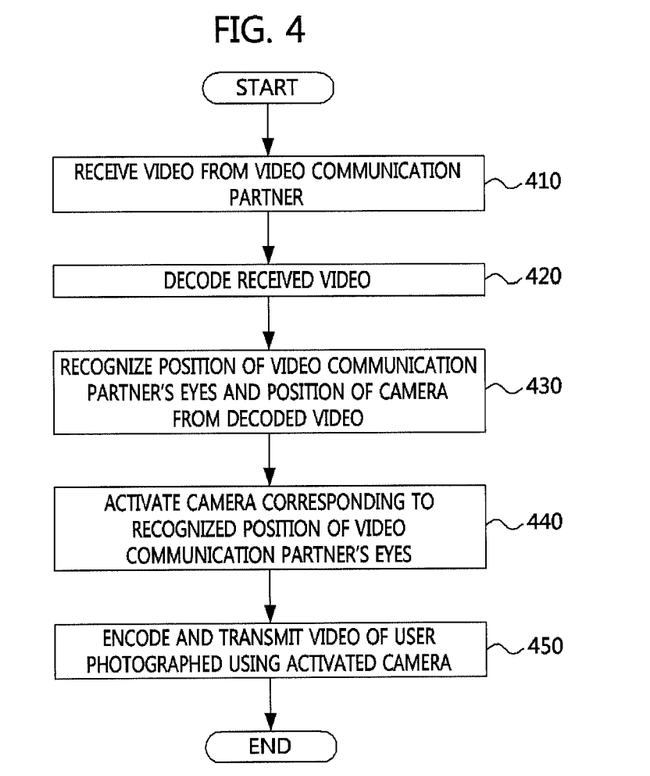
FIG. 4 is a flowchart showing the video communication method according to an example embodiment of the present invention.
Figure 5:
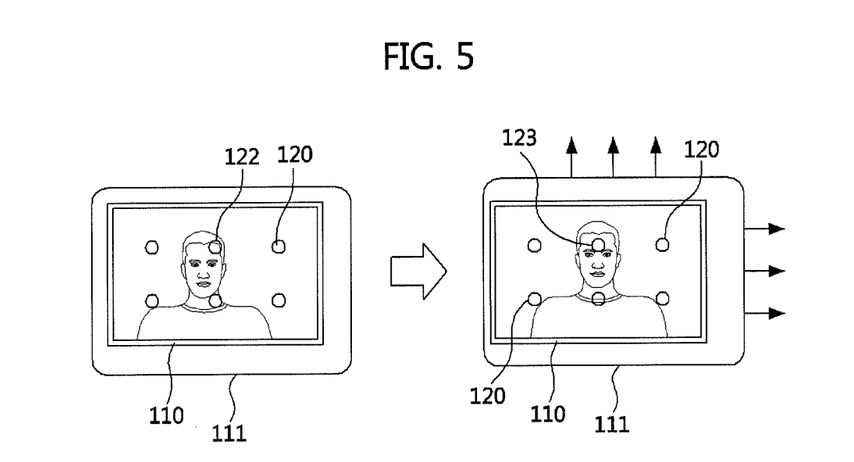
FIG. 5 is a conceptual diagram illustrating a process of recognizing a position of a video communication partner's eyes shown in FIG. 4.

FIG. 4 is a flowchart showing the video communication method according to an example embodiment of the present invention. FIG. 5 is a conceptual diagram illustrating a process of recognizing the position of the video communication partner's eyes shown in FIG. 4.

Referring to FIGS. 4 and 5, when video communication starts, a video communication apparatus of the user (hereinafter referred to as "transmitting video communication apparatus") receives a video of the video communication partner from the video communication apparatus of the video communication partner (hereinafter referred to as "receiving video communication apparatus") (step 410), and decodes the received video (step 420).

Then, the transmitting video communication apparatus recognizes an eye position from the decoded video of the video communication partner (step 430). Here, the transmitting video communication apparatus may recognize the position of the video communication partner's eyes by performing video processing on the decoded video of the video communication partner or by extracting camera position information included in the encoded video provided from the receiving video communication apparatus.

Then, the transmitting video communication apparatus activates a camera corresponding to the position of the video communication partner's eyes recognized as described above or a camera position in which the video communication partner is photographed (step 440).

The transmitting video communication apparatus captures the video of the user via the activated camera, encodes the captured video and transmits the encoded video of the user to the receiving video communication apparatus (step 450).

In a video communication process, if a size of a display area of the display unit is much greater than the number of cameras installed in the display unit, there may not be the camera installed in the position corresponding to the position of the video communication partner's eyes. In this case, the camera photographs a wider range than the display area of the display unit and transmits a captured video, and the video communication apparatus receiving the captured video adjusts a position of an output video so that the camera may be positioned in the position of the video communication partner's eyes.

That is, if the size of the display area of the display unit 110 is greater than the number of cameras 120 installed in the display unit 110 as shown in FIG. 5(a) and an activated camera 122 photographs a wider area 111 than the display area of the display unit 110 and encodes and transmits a captured video, the video communication apparatus of the user receives and decodes the captured video 111, recognizes a position of the video communication partner's eyes from the decoded video, activates a camera 123 closest to the recognized eye position, adjusts the display area of the decoded captured video 111 (e.g., moves, enlarges, reduces or crops the video) and outputs the resultant video so that the position of the activated camera 123 matches the position of the video communication partner's eyes as shown in FIG. 5(b).

Alternatively, if the size of the display area of the display unit 110 is greater than the number of cameras 130 installed in the display unit 110 as shown in FIG. 5(a), the wider area 111 than the display area of the display unit 110 may be photographed by the activated camera 122, the captured video may be adjusted as shown in FIG. 5(b) before being encoded and transmitted, so that the position of the activated camera matches the position of the user's eyes, and then the resultant video may be encoded and transmitted to the video communication apparatus of the video communication partner. In this case, in the video communication apparatus receiving the video, the video adjustment process shown in FIG. 5(b) is unnecessary. With the display range adjustment as described above, an eye-to-eye contact effect can be sufficiently achieved using only a single camera in a video terminal (e.g., a portable telephone) having a certain limited size.

As described above, the video communication method according to an example embodiment of the present invention may also be applied to video communication between a plurality of users.

That is, for respective videos received from a plurality of video communication partners, positions of the video communication partners' eyes are recognized, cameras corresponding to the positions of the video communication partner's eyes among a plurality of cameras installed in a display unit are activated to photograph certain respective areas, and captured videos are combined, encoded, and transmitted such that video communication with eye-to-eye contact among a plurality of users can be performed through a single display unit included in the video communication apparatus.

Any method for eye-to-eye contact is periodically performed during video communication such that a camera corresponding to a position of the user's eyes is selectively activated according to a movement of the user and accordingly the eye-to-eye contact can always be achieved irrespective of the movement of the user during the video communication.

Figure 6:
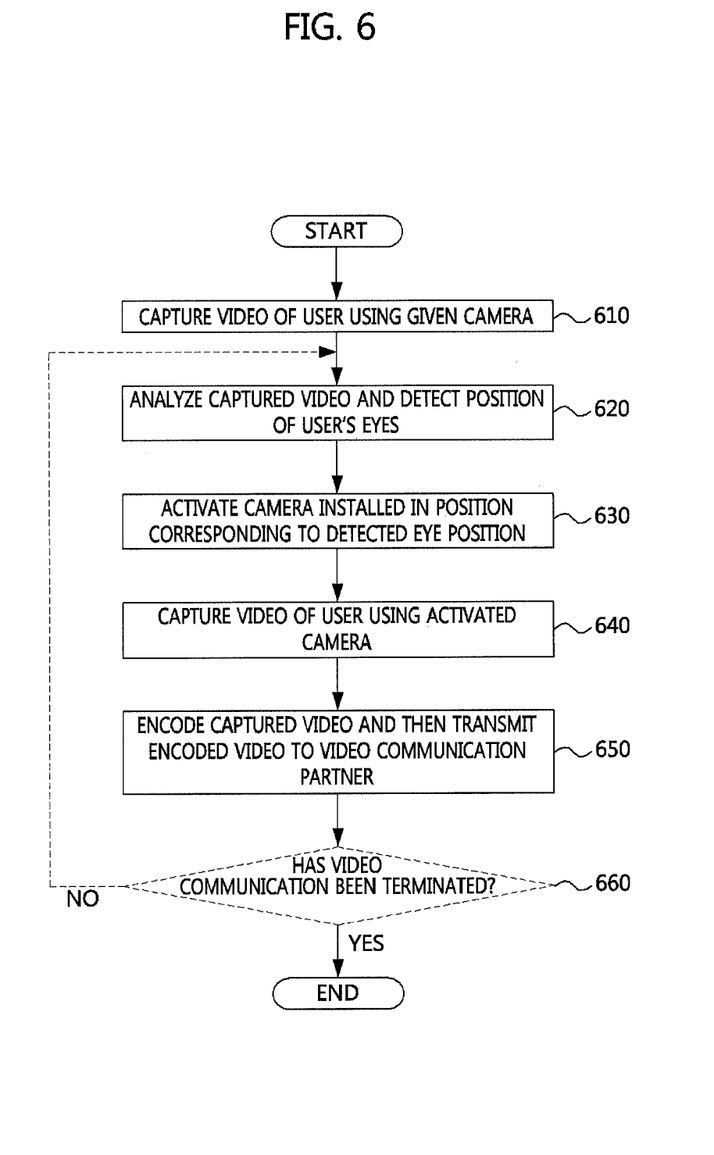
FIG. 6 is a flowchart illustrating a video communication method according to another example embodiment of the present invention.

FIG. 6 is a flowchart illustrating a video communication method according to another example embodiment of the present invention. A process in which a transmitting video communication apparatus activates a camera corresponding to a position of a user's eyes to capture a video, encodes the captured video, and transmits the encoded video to a receiving video communication apparatus of a video communication partner is illustrated.

Referring to FIG. 6, if video communication is executed, the transmitting video communication apparatus activates a given camera installed in the display unit and captures a video of a user (step 610).

Then, the transmitting video communication apparatus analyzes the captured video, detects a position of the user's eyes (S620), and activates the camera installed in a position corresponding to the detected position of the user's eyes (step 630). Here, if the camera activated in step 610 is the same as the camera activated in step 630, the camera activated in step 610 remains activated. If the cameras activated in steps 610 and 630 are different from each other, the camera activated in step 610 is deactivated.

If the position of the user's eyes is not detected in step 620, the camera activated in step 610 is deactivated, another adjacent camera is activated, and steps 620 and 630 are iteratively performed.

Then, the transmitting video communication apparatus captures the video of the user using the camera activated in step 630 (step 640), encodes the captured video according to a previously set coding standard, and transmits the encoded video to the receiving video communication apparatus of the video communication partner (step 650).

Further, the transmitting video communication apparatus selectively determines whether the video communication has been terminated (step 660). If it is determined that the video communication has not been terminated, the process returns to step 620, such that the camera corresponding to the position of the user's eyes can be selectively activated according to a movement of the user and accordingly eye-to-eye contact can always be achieved irrespective of the movement of the user during video communication.

With the video communication method as shown in FIG. 6, an image of the user can always stay in a designated position of the display unit of the partner irrespective of a motion of the user.

According to the video communication apparatus having an eye-to-eye communication function and the method thereof as described above, the video received from the video communication partner is analyzed to detect the position of the video communication partner's eyes, the camera installed in the position corresponding to the detected eye position among the plurality of cameras installed in the display unit is activated to capture a video of the user, and then the captured video is encoded and transmitted to the video communication apparatus of the video communication partner.

Accordingly, the video communication with eye-to-eye contact can be easily performed without a separate mirror or subsidiary device for eye-to-eye contact, and clear video communication can be performed by capturing the video using the camera corresponding to the position of the user's eyes. Further, if the eye-to-eye video communication method is applied to multi-party video communication, video communication with eye-to-eye contact between a plurality of video communication partners can be performed.

While the example embodiments of the present invention and their advantages have been described in detail, it should be understood that various changes, substitutions and alterations may be made herein without departing from the scope of the invention.

BRIEF DESCRIPTION OF REFERENCE NUMERALS

110: display unit
130: first video processor
150: transceiver
120: camera
140: second video processor
160: camera selector

What is claimed is:

1. A video communication apparatus comprising:
    a display unit configured to display a video of a video communication partner, the display unit including a plurality of cameras activated according to a selection control signal;
    a video processor configured to encode a captured video from the activated camera among the plurality of cameras, and to decode a video provided from the video communication partner and identify a position of the video communication partner's eyes from the decoded video;
    a camera selector configured to activate the camera installed in a position corresponding to the position of the video communication partner's eyes among the plurality of cameras; and
    a transceiver configured to transmit the encoded video provided from the video processor to the video communication partner, and provide the video received from the video communication partner to the video processor.

2. The apparatus of claim 1, wherein each of the plurality of cameras photographs a wider area than a display area of the display unit.

3. The apparatus of claim 1, wherein the video processor receives a captured video from a prescribed given camera among the plurality of cameras, recognizes a position of the user's eyes based on the received video, determines a position of a camera corresponding to the recognized position of the user's eyes, and provides information of the determined position of the camera to the camera selector.

4. The apparatus of claim 3, wherein the camera selector activates the prescribed given camera if video communication is executed, and then provides a selection control signal for activating a camera corresponding to the information of the determined camera position provided from the video processor among the plurality of cameras if the information of the determined position of the camera is provided from the video processor.

5. The apparatus of claim 3, wherein the video processor encodes the information of the determined position of the camera together with the captured video and provides the resultant video to the transceiver.

6. The apparatus of claim 1, wherein the video processor decodes the video of the video communication partner, extracts position information of an activated camera of the video communication partner, and provides the position information to the camera selector.

7. A method of performing video communication in a video communication apparatus, the method comprising:
    decoding a video received from a video communication partner;
    recognizing a position of the video communication partner's eyes from the decoded video;
    activating a camera installed in a position corresponding to the recognized position of the video communication partner's eyes among a plurality of cameras installed in a display unit of the video communication apparatus; and
    encoding a captured video provided from the activated camera and transmitting the encoded video to the video communication partner.

8. The method of claim 7, wherein the recognizing of the position of the video communication partner's eyes from the decoded video comprises extracting position information of the activated camera of the video communication partner from the decoded video.

9. The method of claim 7, further comprising: after recognizing a position of the video communication partner's eyes from the decoded video, adjusting a position in which the decoded video is to be displayed according to the recognized position of the video communication partner's eyes, and displaying the video.

10. The method of claim 9, wherein the adjusting of the position in which the decoded video is to be displayed comprises adjusting a display position of the decoded video so that the position of the video communication partner's eyes included in the decoded video matches the position of the activated camera.

11. A method of performing video communication in a video communication apparatus, the method comprising:
  capturing a video of a user;
  detecting a position of the user's eyes based on the captured video of the user;
  activating a camera installed in a position corresponding to the detected position of the user's eyes among a plurality of cameras installed in a display unit of the video communication apparatus; and
  encoding a captured video provided from the activated camera and transmitting the encoded video to a video communication partner.

* * * * *